J. C. JENKINS.
Cotton-Seed Planter.
No. 164,304. Patented June 8, 1875.
Fig: 1.
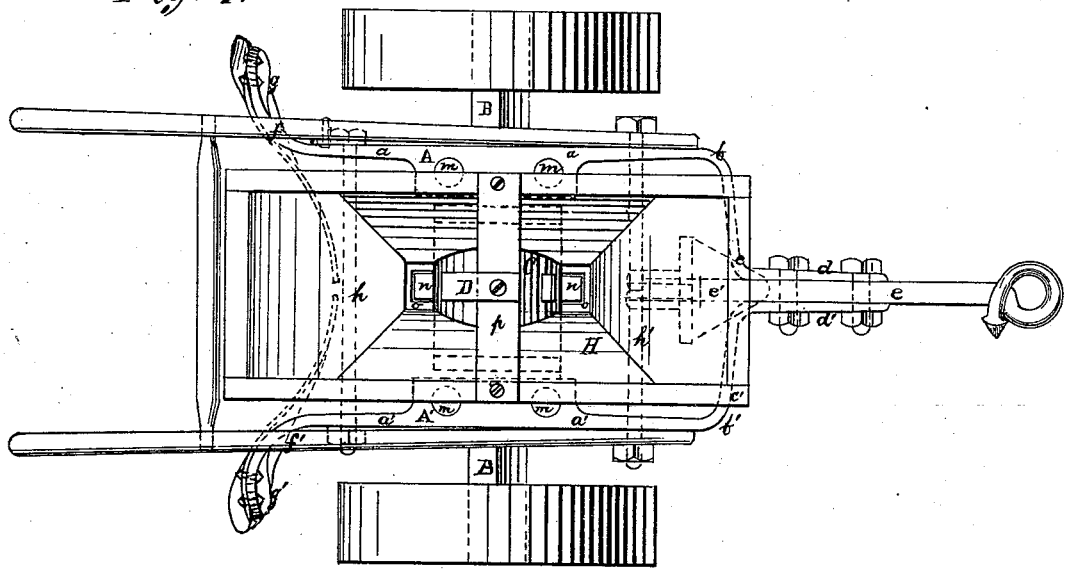
Fig: 2
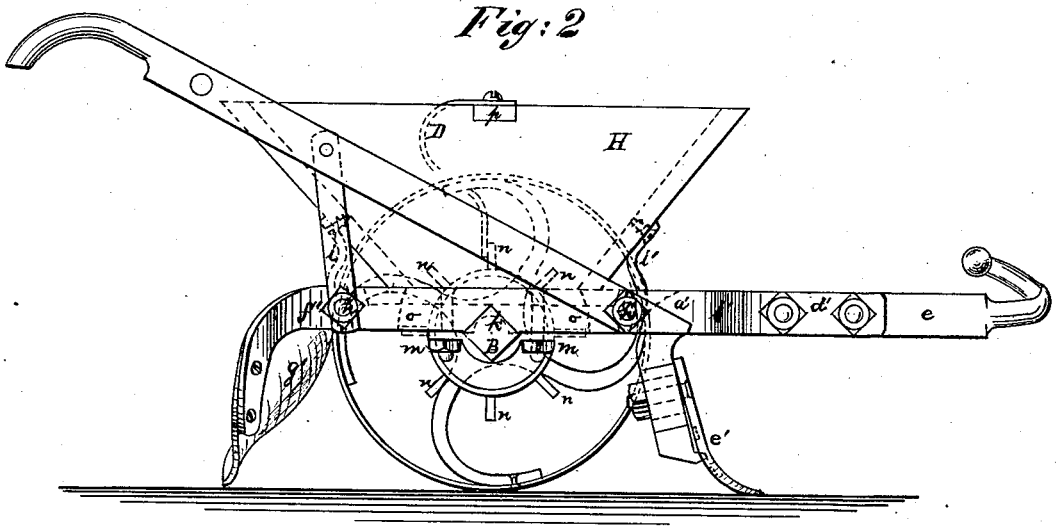
Fig: 3.
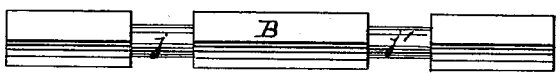
Witnesses:
Henry Eichling
Ben. S. Clark
Inventor
Joseph C. Jenkins
By Fitch & Fitch
His Attys.

UNITED STATES PATENT OFFICE.

JOSEPH C. JENKINS, OF LEBANON, TENNESSEE, ASSIGNOR OF ONE-HALF HIS RIGHT TO JAMES G. JOLLEY, OF SAME PLACE.

IMPROVEMENT IN COTTON-SEED PLANTERS.

Specification forming part of Letters Patent No. 164,304, dated June 8, 1875; application filed April 20, 1875.

*To all whom it may concern:*

Be it known that I, JOSEPH C. JENKINS, of Lebanon, county of Wilson and State of Tennessee, have invented an Improved Cotton-Seed Planter, of which the following is a specification, reference being had to the accompanying drawings forming part hereof.

My invention consists in the combination, with the hopper of a seed-planter, of a leaf-spring depending from a cross-piece down into the hopper nearly to the bottom thereof, and arranged to engage at its lower end with a series of feeders or paddles set in a cylinder on the axle underneath the hopper, whereby all clogging of the seed in the hopper during the operation of planting is prevented.

Figure 1 is a plan view of a cotton-seed planter embodying my invention. Fig. 2 is a side elevation of the same, and Fig. 3 is a plan of my four-sided axle.

The frame of my planter is composed of the wrought-iron bars A and A′, the portions $a$ and $a'$ of which form the sides of the frame, which are bent at $b$ and $b'$ inward toward each other at nearly right angles, to form the front of the frame, and are turned forward again at right angles at $c$ and $c'$ to form the hounds $d$ and $d'$, between which the tongue-piece $e$ carrying the shovel $e'$ is fitted, and to which it is bolted, as shown. The rear ends of the side portions $a$ and $a'$ are curved outward and downward, as shown at $f$ and $f'$, and upon these curved ends are secured the scrapers $g$ and $g'$, as shown. $h$ and $h'$ are cross-bars bolted to the sides $a$ and $a'$ at the front and rear, respectively, as shown. H is the hopper, mounted upon the frame and held in position by braces $i$ and $i'$. B is the axle, made four-sided, and having cylindrical bearing-spaces at $j$ and $j'$, as shown in Fig. 3, and is secured in bearings $k$ in the sides $a$ and $a'$ of the frame by clamps $l$ and bolts $m$. Upon the central portion of the axle B is fixed the cylinder C, which protrudes upward into the lower part of the hopper, the sides and a portion of the bottom of which are cut away somewhat for this purpose, as shown. Located centrally upon the surface of the cylinder C are fixed a number of radiating projecting paddles or feeders, $n$, which, when the cylinder is revolved, operate to successively open and close suitable notches or openings $o$ in the bottom of the hopper. D is a leaf-spring, secured at its upper end upon the cross-piece $p$ on the top of the hopper and extending downward into the hopper, so that its lower end engages with the outer ends of the projecting paddles $n$ when they are revolved.

Now it is evident that in the operation of planting seed with my machine a continuous movement of the seed in the lower part of the hopper will be maintained, and all clogging of the seed entirely obviated by the action of the paddles $n$ revolving with the cylinder upon the axle, and by the vibration of the spring D caused by its continuous engagement with the outer ends of the paddles $n$ successively, and that the openings $o$ in the bottom of the hopper will be successively opened and closed by the paddles $n$, and the seed thus allowed to drop in small quantities into the trench dug by the shovel $e'$, when it will be covered with earth by the action of the scrapers $g$ and $g'$.

I do not claim the combination in a cotton-seed planter of the hopper with its perforated bottom, and the cylinder with its paddles or feeders, as I am aware that this combination is not new. I intend to limit my claim to the precise invention herein shown—that is, the combination, with the hopper, of the leaf-spring, which engages at its lower end with a series of paddles or feeders set in the cylinder arranged to revolve on the axle.

What I claim as my invention, and desire to secure by Letters Patent, is—

The combination, in a cotton-seed planter, of the hopper H, the leaf-spring D, depending from the cross-piece $p$, and the cylinder C with its paddles or feeders $n$, as described.

JOSEPH C. JENKINS.

Witnesses:
ALEX. W. VICK,
ED. R. PENNEBAKER, Jr.